Sept. 19, 1950  T. L. WEYBREW  2,523,169
LOCOMOTIVE CONTROL SYSTEM
Filed Oct. 31, 1945
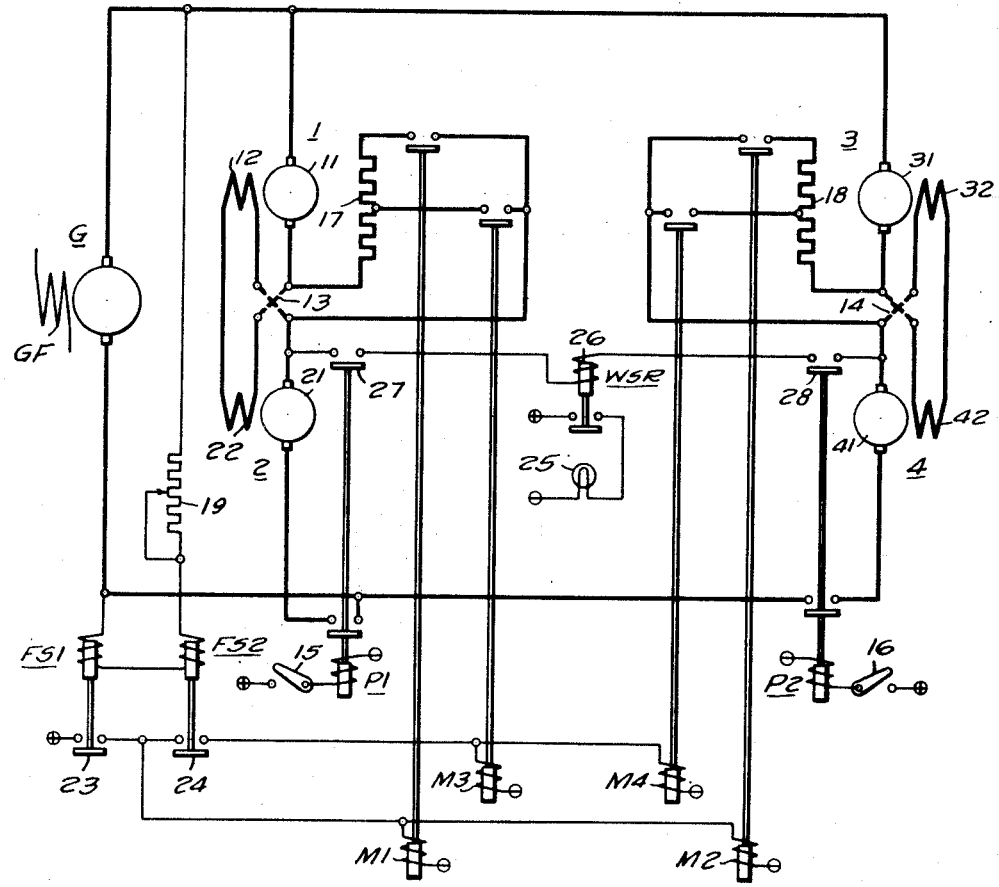
WITNESSES:
INVENTOR
Thelbert L. Weybrew.
BY
ATTORNEY Patented Sept. 19, 1950

2,523,169

UNITED STATES PATENT OFFICE 2,523,169

LOCOMOTIVE CONTROL SYSTEM

Thelbert L. Weybrew, Pittsburgh, Pa., assignor to Westinghouse Electric Corporation, East Pittsburgh, Pa., a corporation of Pennsylvania Application October 31, 1945, Serial No. 625,903

2 Claims. (Cl. 318—93)

My invention relates, generally, to control systems and, more particularly, to systems for controlling the operation of electrically-propelled locomotives.

In order to obtain the desired operating characteristics, the propelling motors of a Diesel-electric locomotive are frequently connected in series-parallel-circuit relation with provision for shunting the fields of the motors to increase their speed. In the past, any slippage of the wheels driven by a pair of series-connected motors has been indicated by a relay connected across the midpoint between the series-connected motors and the midpoint of a resistor connected across the motor armatures. When two or more pairs of motors are utilized, previously known systems for indicating wheel-slippage become unduly complicated since a relay and a resistor must be provided for each pair of motors.

Accordingly, an object of my invention is to provide a simplified and improved system for indicating wheel-slippage on a locomotive having a plurality of pairs of motors connected in series-parallel-circuit relation.

Another object of my invention is to provide a slip-indicating scheme which is suitable for use with motors having field-shunting control.

Other objects of my invention will be explained fully hereinafter or will be apparent to those skilled in the art.

In accordance with one embodiment of my invention, the actuating coil of a slip-indicating relay is so connected between normally equipotential points in the circuits for series-parallel connected motors that the relay is responsive to any unbalance in the motor voltages caused by wheel-slippage, and the field shunting of the motors is so controlled that it does not disturb the normal balance in the motor voltages.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises a plurality of motors 1, 2, 3 and 4, which may be of a type suitable for propelling an electric locomotive (not shown), and a generator G for supplying current to the motors. The generator may be driven by a Diesel engine or other suitable prime mover (not shown) and is provided with a field winding GF, which may be energized from an exciter or other suitable source of excitation (not shown). The motors 1, 2, 3 and 4 are of the series type, the motor 1 having an armature 11 and a series field winding 12. The motor 2 has an armature 21 and a series field winding 22. Likewise, the motor 3 has an armature 31 and a series field winding 32, and the motor 4 has an armature 41 and a series field winding 42.

As shown, the motors 1 and 2 are connected in series-circuit relation, and a reversing switch 13 is provided for controlling their direction of rotation. Likewise, the motors 3 and 4 are connected in series-circuit relation, and a reversing switch 14 is provided for controlling their direction of rotation. A switch P1 is provided for connecting the motors 1 and 2 across the generator G, and a switch P2 is provided for connecting the motors 3 and 4 across the generator, thereby connecting the two pairs of motors in series-parallel-circuit relation in a manner well known in the art. The operation of the switch P1 may be controlled by a manually operable switch 15 and the operation of the switch P2 may be controlled by a manually operable switch 16.

In order to increase the maximum speed of the motors 1, 2, 3 and 4, provision is made for shunting the field windings 12 and 22 of the motors 1 and 2, respectively, through a resistor 17, and the field windings 32 and 42 of the motors 3 and 4, respectively, through a resistor 18. The field shunting circuit through the resistor 17 is established by a switch M1 and the field shunting circuit through the resistor 18 is established by a switch M2. The field shunting effect may be still further increased by switches M3 and M4, which are closed to short portions of the resistors 17 and 18, respectively, from the field shunting circuits, thereby decreasing the excitation of the motors and increasing their speed in a manner well known in the art.

In order to control the operation of the field shunting switches M1, M2, M3 and M4 automatically, relays FS1 and FS2 are provided. As shown, the actuating coils of the relays FS1 and FS2 are connected across the armature of the generator G in series with a variable resistor 19. Therefore, the relays FS1 and FS2 are responsive to the generator voltage which is impressed on the traction motors.

In accordance with the usual practice in the operation of Diesel-electric locomotives, the traction motors are accelerated by increasing the generator voltage applied to the motors. When the generator reaches a certain voltage and, consequently, the motors a certain speed, the relay FS1 closes its contact members 23 to cause the operation of the switches M1 and M2 to establish the field shunting circuits through the resistors 17 and 18. When the generator voltage is increased still further, the relay FS2 closes its contact members 24 to cause the operation of the switches M3 and M4 to short portions of the resistors 17 and 18 from the field shunting circuits, thereby still further increasing the speed of the traction motors.

In order to provide a visual indication of any wheel-slippage which may take place during operation of the locomotive, and particularly during the accelerating period, a relay WSR and an indicating lamp 25 are provided. The relay WSR is provided with an actuating coil 26, one terminal of which is connected through an interlock 27 on the switch P1 to a point in the circuit between the motors 1 and 2, which is normally at the same potential as a point in the circuit between the motors 3 and 4 to which the other terminal of the coil 26 is connected through an interlock 28 on the switch P2.

Thus, the two terminals of the coil 26 of the relay WSR are at the same potential so long as all of the motors are operating at the same speed. However, if the wheels driven by one of the motors slip, the motor counter electromotive force increases rapidly as its speed increases. The other motor in series with the slipping motor is still running at its normal speed. The voltage of the slipping motor increases still further, thereby decreasing the voltage of the non-slipping motor until the difference in the potential impressed upon the coil of the relay WSR is sufficient to cause the relay to close its contact members, thereby lighting the indicating lamp which warns the operator of the slipping condition. The slipping may be stopped by the operator's reducing the generator voltage, thereby establishing the equi-potential condition in the motor circuits and extinguishing the indicating lamp 25.

As explained hereinbefore, the field shunting switches M1 and M2 are operated simultaneously to shunt the fields for both pairs of motors without disturbing the equi-potential condition by the field shunting operation. Likewise, the switches M3 and M4 are closed simultaneously to complete the field shunting operation without disturbing the equi-potential condition which exists so long as the motors all operate at the same speed. In this manner the field shunting is accomplished without causing the operation of the slip-responsive relay WSR, which functions to detect and indicate wheel-slippage.

Since one pair of motors may be taken out of service in case of an emergency by opening either the switch P1 or the switch P2, the interlocks 27 and 28 are provided on the switches P1 and P2, respectively, to prevent the operation of the slip relay WSR in case one set of motors is cut out of service. In this manner operation of the slip relay is prevented under emergency conditions.

From the foregoing description it is apparent that I have provided a wheel-slippage indicating system which is suitable for use with motors which are connected in series-parallel circuit relation, and in which field shunting of the motors is utilized to increase their maximum speed of operation. The present system permits the field shunting to be accomplished without affecting the normal operation of the wheel-slippage indicating system. While the present system is particularly suitable for application to a Diesel-electric locomotive, it is not necessarily limited thereto.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system, in combination, a plurality of pairs of series-connected traction motors, each motor having an armature winding and a series field winding, a generator for supplying power to the motors, switching means for connecting the motors to the generator in series-parallel circuit relation, a relay having contact members and an actuating coil with one terminal of the coil connected to a point between one pair of series-connected motors and the other terminal connected to a point between another pair of series-connected motors, said points having the same potential when the motors are operating at the same speed and have equal excitation, means for shunting the field windings of said pairs of motors, relay means responsive to the voltage of the generator for causing the simultaneous operation of said shunting means in successive steps, whereby the motors have equal excitation during the steps of field shunting and said relay coil is energized only as a result of an unbalance in the motor speeds, and signalling means energized through the relay contact members.

2. In a control system, in combination, a plurality of pairs of series-connected traction motors, each motor having an armature winding and a series field winding, a generator for supplying power to the motors, switching means for connecting the motors to the generator in series-parallel circuit relation, a relay having contact members and an actuating coil with one terminal of the coil connected to a point between one pair of series-connected motors and the other terminal connected to a point between another pair of series-connected motors, said points having the same potential when the motors are operating at the same speed and have equal excitation, means for simultaneously shunting the field windings of the pairs of motors in successive steps, relay means responsive to the voltage of the generator and having contact means connected in series-circuit relation for controlling the operation of said shunting means, whereby the motors have equal excitation during the steps of field shunting and said relay coil is energized only as a result of an unbalance in the motor speeds, and signalling means energized through the relay contact members.

THELBERT L. WEYBREW.

REFERENCES CITED

The following references are of record in the file of this patent:

UNITED STATES PATENTS

| Number | Name | Date |
|---|---|---|
| 1,216,126 | Jackson | Feb. 13, 1917 |
| 2,280,378 | Cowin | Apr. 21, 1942 |
| 2,304,937 | Lillquist | Dec. 15, 1942 |
| 2,314,588 | Lillquist | Mar. 23, 1943 |
| 2,328,994 | Ogden | Sept. 7, 1943 |